United States Patent [19]
Mills

[11] Patent Number: 5,358,036
[45] Date of Patent: Oct. 25, 1994

[54] SAFETY DISC BRAKE ASSEMBLY

[76] Inventor: Robert A. R. Mills, 8903 Baylor Cr. S.W., Calgary, Alberta, Canada, T2V 3N5

[21] Appl. No.: 92,228

[22] Filed: Jul. 15, 1993

[30] Foreign Application Priority Data

Jul. 16, 1992 [CA] Canada .................... 2074013

[51] Int. Cl.⁵ .............................. F04B 49/10
[52] U.S. Cl. .................... 166/68.5; 188/71.2; 417/214
[58] Field of Search .......... 166/68.5, 78; 188/72.1, 188/82.1, 82.5; 417/223, 214

[56] References Cited

U.S. PATENT DOCUMENTS

| | | | |
|---|---|---|---|
| 2,518,701 | 8/1950 | Luenberger | 188/82.5 |
| 3,536,169 | 10/1970 | Arnold | 188/82.1 |
| 4,017,217 | 4/1977 | Lamers | 417/223 X |
| 4,216,848 | 8/1980 | Shimodaira | 188/71.2 |
| 4,797,075 | 1/1989 | Edwards et al. | 418/48 |
| 4,993,276 | 2/1991 | Edwards | 74/411.5 |

Primary Examiner—Hoang C. Dang
Attorney, Agent, or Firm—Andrus, Sceales, Starke & Sawall

[57] ABSTRACT

A relatively simple hydraulically operated disc brake mechanism for drive systems which store reactive torque by reason of being under torsion is disclosed. Certain drive systems such as the drive strings for deep well submersible pumps store considerable reactive torque due to torsional stresses. Such torque must be controllably released if drive power is interrupted. The disc brake mechanism includes a housing that defines a reservoir for lubricating oil for the bearings of a shaft that drives a bi-directional hydraulic pump. When the shaft turns in an operating direction, the pump pumps the lubricating oil in a closed circuit through a filter and back to the reservoir. If normal operation is interrupted and the reactive torque in the system is released, the bi-directional pump forces oil through a control manifold to a disc brake caliper which brakes a disc rotor attached to the shaft. The faster the shaft turns as it releases reactive torque, the more braking force applied. As reactive torque is released, pump speed drops and brake force is correspondingly reduced until all reactive torque is released from the drive string permitting safe handling and soft restart of the drive string. The advantage is much improved safety and a self-regulating brake mechanism that handles power interruptions without manual intervention.

20 Claims, 9 Drawing Sheets

SAFETY DISC BRAKE ASSEMBLY

The present invention relates to safety brake assemblies and, in particular, to safety brake assemblies for drive strings which store reactive torque by reason of being under torsion.

BACKGROUND OF THE INVENTION

Certain drive systems are subject to torsional stresses which are stored as reactive torque in a drive train. When drive power to the system is interrupted, the reactive torque is released as back-spin and, if an uncontrolled release of torque occurs, personal injury and/or property damage can result. For example, deep well submersible pumps such as progressing cavity pumps driven by sucker rod strings are commonly used to pump oil from deep wells. The drive string for these submersible pumps usually have a relatively small diameter of ¾ to 1⅛ inches. Such drive strings are commonly used in wells that vary from 1,500' to 6,000' in depth, 3,000' being a common average. Progressing cavity pumps include a stator which is attached to a production casing at the bottom of a well and a rotor which is attached to a bottom end of the drive string. Progressing cavity pumps are frequently used to pump viscous crude oil which is often laden with sand or other impurities. As a result, the elongated drive string is subject to considerable torsional force. This torsional force is stored in the elongated drive string as reactive torque. In a 3,000 foot string, as many as several hundreds of revolutions of torsion can be stored in the string if viscous sand laden crude oil is being pumped. When power is interrupted to the drive string, the reactive torque is released. Unless the release of reactive torque is controlled, costly and undesirable damage to equipment and/or personal injury to workmen in the vicinity can result. This is particularly true if an electric motor is used as a power source because such motors offer almost no resistance to reverse rotation.

If drive power is interrupted to the drive string of a progressing cavity pump, the reactive torque is desirably released in a controlled fashion. Brakes which simply prevent the release of the reactive torque in the drive string are unsatisfactory for two reasons. First, it is preferable that in the case of an electric motor drive, the motor restart unattended when power is restored. In order to ensure a successful unattended restart, the motor must start without load. If the reactive torque in the drive string is not released prior to restart, the motor may not be capable of restarting and the motor may be damaged as a result. Second, if pump repair or replacement is required any unreleased torque in the drive string can be extremely dangerous for unaware workmen. Severe personal injury can result from the unintentional release of reactive torque in such drive strifes.

Consequently, braking systems have been invented to controllably release the back-spin due to reactive torque in elongated drive strings. The most common back-spin control equipment now in use is a fluid brake that includes a pump engaged only when reactive torque is released from the drive string. The pump is used to circulate hydraulic fluid or lubricating oil from a reservoir to a bearing case through a restricted orifice. The resistance of the fluid created by the restriction serves to control the release of reactive torque. Nonetheless, this apparatus is subject to several disadvantages which include:

1) Practically all of the stored energy dissipated by the brake is converted into heat in the circulated fluid. The heat tends to break down the fluid, resulting in a loss of lubricating quality which may cause mechanical failure of the pump. The excess heat can also damage seals and the loss of lubricating quality can eventually damage drive bearings and gears used in the assembly.
2) The pumps are typically mounted internally in an oil bath and are therefore difficult to access for repairs and maintenance.
3) Most such brakes are not adjustable to accommodate various load levels so that the same brake capacity is provided regardless of the length of the drive string or the reactive torque stored in the drive string.
4) Generally, pumps of adequate capacity are too large and expensive to be used for this application. As a result, small pumps that are inadequate to withstand the torques encountered are relied upon, often with unsatisfactory results.

Other brake systems for controlling reactive torques have been invented. Those brake systems are based on centrifugal braking principles. Examples of such braking systems are found in U.S. Pat. Nos. 4,216,848 which issued to Toyohisa Shiomdaira on Aug. 12, 1980; 4,797,075 which issued to Wallace L. Edwards et al on Jan. 10, 1989 and 4,993,276 which issued to Wallace L. Edwards on Feb. 19, 1991. The brakes disclosed in these patents all include brake shoes which are mounted within a housing and are therefore difficult to access and maintain. Such brakes require frequent maintenance when they are used to stop the reverse rotation of drive strings in a controlled manner. In addition, they are mechanically complicated and include custom-made moving parts which are costly to manufacture and expensive to keep in inventory.

SUMMARY OF THE INVENTION

It is an object of the invention to provide a relatively simple, reliable brake system which is easy to maintain for permitting axial rotation of a shaft in one direction while inhibiting axial rotation of the shaft in the opposite direction.

It is a further object of the invention to provide a disc brake system for controllably releasing reactive torque stored in elongated drive strings by reason of being under torsion.

It is yet a further object of the invention to provide a brake system for elongated drive strings which releases reactive torque from the drive string in a self-regulated manner that ensures that the reactive torque is completely dissipated in a controlled release.

There is provided in accordance with the invention a disc brake assembly for permitting axial rotation of a shaft in a first direction and inhibiting axial rotation of the shaft in an opposite directions comprising:

a brake disc mounted on the shaft for rotation with the shaft;
a fluid actuated brake mechanism adapted to engage the brake disc and retard rotation of the disc and consequently to retard rotation of the shaft;
a bi-directional pump for pumping fluid from a reservoir, the pump being driven by the shaft;
a control manifold for directing the fluid from the pump back to the reservoir when the shaft turns in a first direction and for directing fluid to the brake mechanism to retard rotation of the shaft when the shaft turns in the opposite direction, In accordance with a further aspect of the invention there is provided a self-regulating disc brake assembly for controllably releasing reactive torque stored in an axially rotatable elastic member under torsion, comprising:

a shaft coupled with the elastic member to be axially rotatable with the elastic member in either direction;

a brake disc mounted on the shaft for rotation with the shaft;

a fluid actuated brake mechanism adapted to engage the brake disc and retard rotation of the brake disc and consequently to retard rotation of the shaft and the elastic member;

a bi-directional pump for pumping fluid from a reservoir, the pump being driven by the shaft;

a control manifold for directing the fluid from the pump back to the reservoir when the elastic member turns in a first direction to induce torsion in the member, and for directing fluid to the brake mechanism when the elastic member stops turning in the first direction and stored reactive torque is released from the elastic member under torsion, In accordance with the further aspect of the invention there is provided a self-regulating disc brake assembly for controllably releasing reactive torque due to torsion stored in a drive string for a down hole submersible pump in a well, comprising:

a shaft coupled with the drive string and rotatable therewith;

a reservoir surrounding and rotatably supporting the shaft;

a coupling for connecting the reservoir to a wellhead assembly of the well;

a brake disc affixed to the shaft and rotatable therewith;

a fluid actuated disc caliper that straddles the brake disc for engaging the brake disc and retarding rotation thereof, and consequently for retarding rotation of the shaft and the drive string;

a bi-directional pump for pumping fluid from the reservoir, the pump being driven by a gear attached to the shaft;

a control manifold for directing the fluid from the pump to the reservoir when the drive string is driven in a direction to drive the down hole pump, and for directing fluid to the brake caliper when the drive string is no longer driven and reactive torque is released from the drive string to turn the shaft in an opposite direction.

The invention therefore provides a simple self-regulating brake mechanism which safely and controllably releases reactive torque from elastic members and, in particular, from elongated drive strings used to drive down hole submersible pumps such as progressing cavity pumps.

The disc brake in accordance with the invention is also adapted for use in any environment where a shaft is permitted to rotate freely in one direction but must be inhibited from uncontrolled rotation in the opposite direction. The brake is a self-regulating motion arrester, not a static brake system. In other words, the faster a shaft rotates in the inhibited direction, the more braking pressure is applied up to a preselected maximum braking pressure. As the motion of the shaft is retarded, the braking pressure is accordingly reduced. When the shaft loses all momentum, the brake calipers releases the brake pads from the brake disc and the shaft is free to commence rotation in either direction.

In accordance with the preferred embodiment, the brake caliper is mounted to a reservoir which surrounds the shaft. The bi-directional pump is preferably mounted on the reservoir and exposed for ready access. The fluid in the reservoir is preferably a lubricating oil. The preferred embodiment is also provided with a fluid filter to continuously filter the lubricating oil in the reservoir.

BRIEF DESCRIPTION OF THE DRAWINGS

The invention will now be described by way of example only and with reference to the following drawings, wherein.

DETAILED DESCRIPTION OF THE PREFERRED EMBODIMENTS

The disc brake assembly in accordance with the invention is useful for controlling the back-spin of elongated drive strings which store reactive torque due to torsional stress, such as the sucker rod strings used to drive submersible down hole pumps. The disc brake assembly is not limited to that application and may be used in conjunction with any shaft which transmits reactive torque that must be safely and controllably released. For purposes of illustration only, the disc brake assembly in accordance with the invention is described in conjunction with a mounting suitable for use with a sucker rod string typically used to drive a submersible down hole pump such as a progressive cavity pump.

Figure 1:
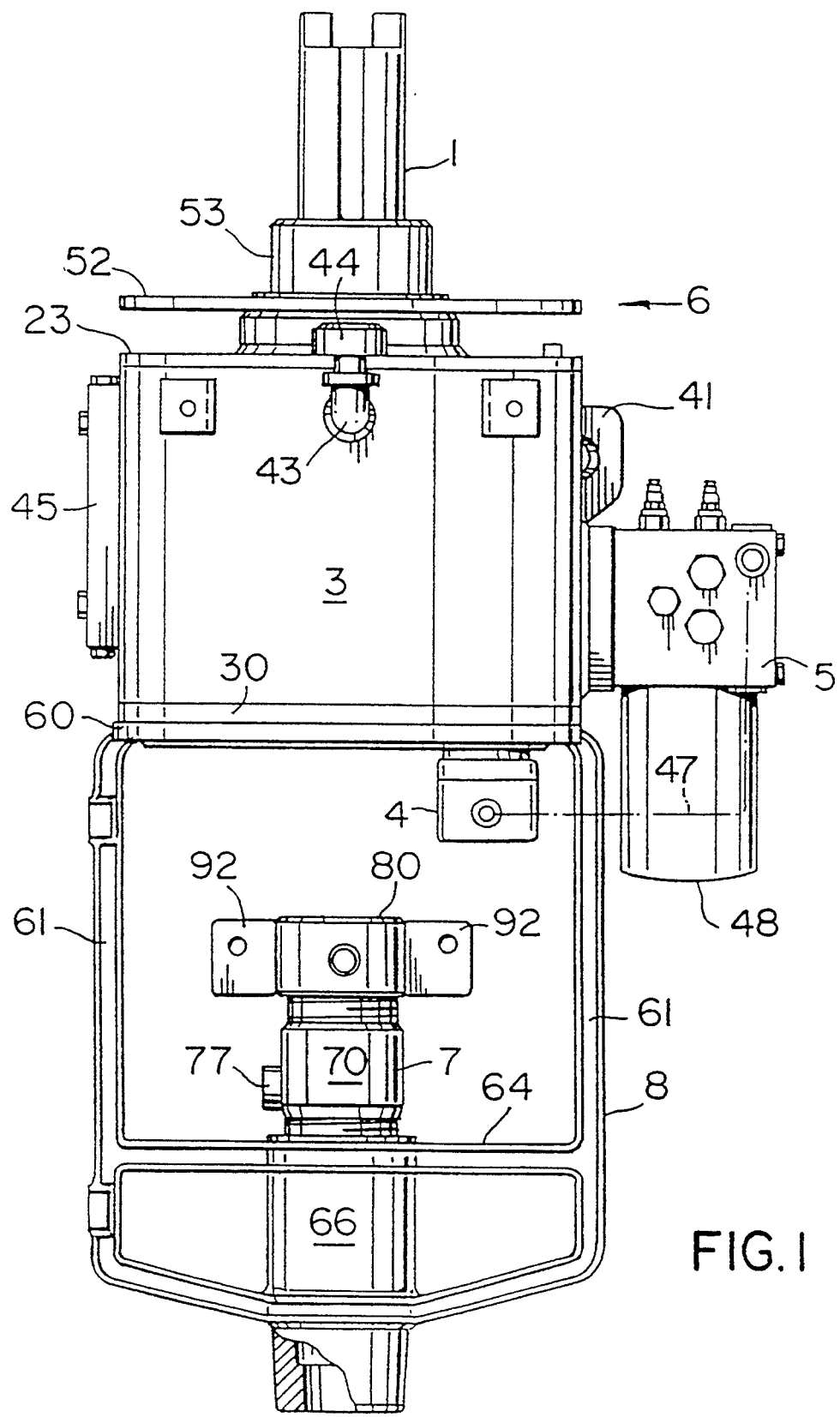
FIG. 1 is a front elevational view of a disc brake assembly in accordance with the invention mounted on a support yoke suitable for use with a down hole submersible pump drive string.
Figure 2:
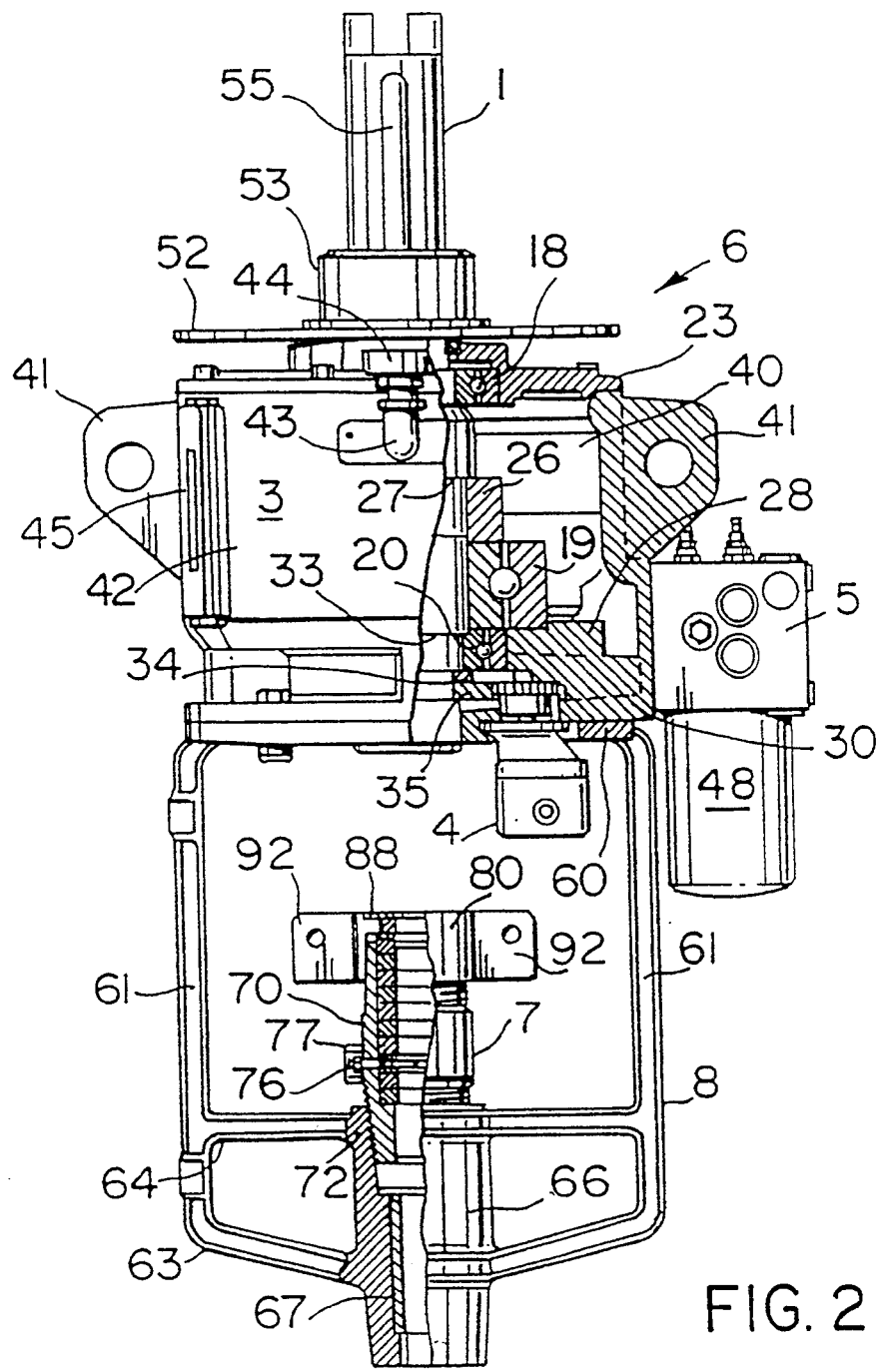
FIG. 2 is a partially cut away view of a second embodiment of the disc brake assembly shown in FIG. 1.
Figure 3:
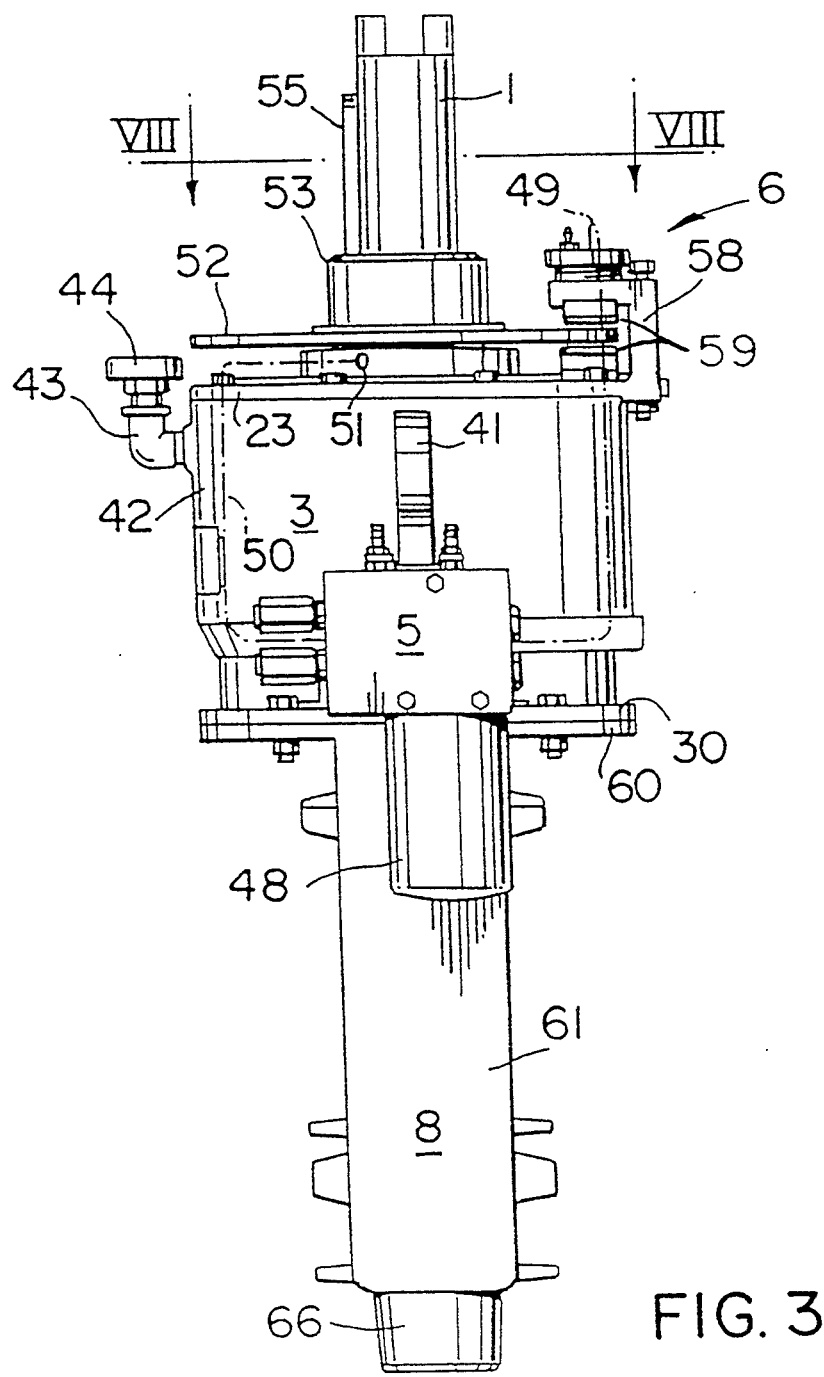
FIG. 3 is a side elevational view of the disc brake assembly shown in FIG. 2.

FIGS. 1 and 2 show front elevational views of two embodiments of the invention which differ only in external configuration. FIG. 3 shows a side elevational view of the embodiment shown in FIG. 2.

The invention generally comprises a housing 3 which forms a fluid reservoir 40 (see FIG. 2) from which a fluid, preferably a lubricating oil, is pumped by a bi-directional hydraulic pump 4 to a control manifold 5. When a shaft 1 which drives the bi-directional pump 4 turns in a first direction, the control manifold 5 directs fluid back to the reservoir 40. When the shaft 1 turns in an opposite direction, the bi-directional hydraulic pump 4 pumps fluid to the control manifold 5 through a separate fluid transmission line and the control manifold 5 directs the fluid to a disc brake assembly indicated by reference 6, which includes a hydraulic brake caliper 58 (see FIG. 3) which straddles a brake disc 52. The fluid pressure on the caliper 58 forces brake pads 59 into contact with the brake disc 52 which is connected by a key 55 to the shaft 1, as will be explained below in more detail. Thus, the rotation of the shaft 1 in the opposite direction is retarded so that the shaft 1 cannot spin uncontrollably in the second direction. As the motion of shaft 1 is retarded, the fluid pressure output by the pump 4 is likewise decreased and the pressure on brake pads 59 is correspondingly reduced so that the braking force is relieved and the shaft is permitted to spin in the second direction. The spinning of the shaft in the second direction, nonetheless, increases the fluid pressure to the brake caliper 58 which forces the brake pads 59 into stronger contact with the brake disc 52 and the braking action is resultingly increased. A safety brake mechanism which operates in a self-regulating control loop to release stored torque is therefore provided.

The housing 3 is mounted to a yoke 8 (see FIG. 2) which includes an annular top ring 60, a pair of side beams 61 which extend downwardly from the top ring 60, a bottom bar 63 that is integral with the side beams 61 and a crossbar 64 that is also integral with the side beams 61 and extends between them. The bottom bar 63 and the crossbar 64 are connected by a web which forms an I-beam to support the weight of a sucker rod string (not illustrated) used to drive a down hole submersible pump. The bottom bar 63 and the crossbar 64 are also integrally formed with a sleeve 66 for receiving a polished rod 2 (see FIG. 5) that passes through a split bushing 67 (FIG. 2). A stuffing box 70 threadingly engages a top end 72 of the sleeve 66. The stuffing box 70 provides a fluid seal around the polished rod 2 that is connected to a top end of the sucker rod string. The stuffing box is constructed in a manner well known in the art and includes packing rings which are retained by a cap 80 that includes a lip seal retainer plate 88 and lifting lugs 92. Lubrication of the polished rod in the stuffing box is provided by grease introduced through a grease nipple 76 which is protected by sleeve 77. The yoke 8 threadingly engages a top end of a wellhead assembly (not illustrated) using an external thread on the bottom end of the sleeve 66. The wellhead assembly therefore supports the yoke 8 and the housing 3 as well as the weight of the sucker rod string, as will be explained below in more detail.

The polished rod 2 extends upward through the sleeve 66 and an axial bore in the shaft 1 which extends through the housing 3. The housing 3 includes a top wall 23 and a bottom wall 30 to define a fluid reservoir 40 that provides a fluid bath for bearings that rotatably support the shaft 1. The housing 3 is vented by an elbow 43 that supports a breather 44 to maintain atmospheric pressure within the housing 3. A fluid level gage 45 affixed to a side wall 42 of the housing 3 provides a visual indication of a fluid level within the housing. Lifting lugs 41 provide a convenient mechanical attachment for manipulating the apparatus. The bi-directional hydraulic pump 4 is driven by a spur gear 35 which is affixed to the shaft 1, The spur gear 35 engages a complementary spur gear 46 (see FIG. 6) mounted to an impeller shaft of the bi-directional pump 4.

Figure 4:
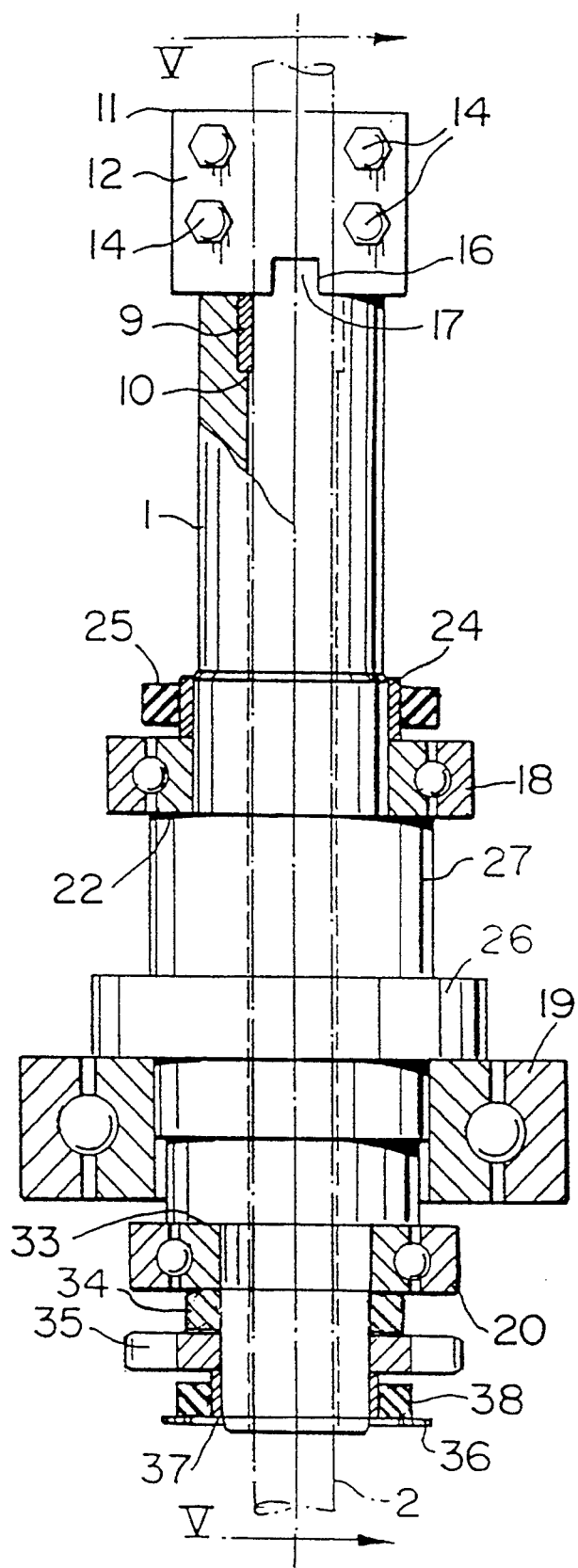
FIG. 4 is a cross-sectional detailed view of the shaft support assembly.

FIG. 4 shows a cross-sectional view of the support bearings for the shaft 1. A bushing 9 is provided on an internal shoulder of an axial bore which extends through the shaft 1. The bushing 9 centers the polished rod 2 in the shaft. The polished rod 2 is typically connected to the shaft 1 by a polished rod clamp 11, well known in the art. The polished rod clamp includes two clamp parts 12 which are interconnected by bolts 14 and nuts 15 (see FIG. 5). Each clamp part 12 includes a notch 16 for receiving a complementary projection 17 on a top end of the shaft 1. Thus the shaft 1 is keyed into the clamp 11 for rotation therewith and the shaft 1 rotates in direct correspondence with the rotation of the polished rod 2.

The shaft 1 is rotatably supported within the housing 3 by a thrust bearing 19 which bears a thrust collar 26 that is supported by a shoulder 27 on the shaft 1. A thrust ledge 28 (see FIG. 2) which extends upwardly from the bottom wall 30 of the housing 3 supports the thrust bearing 19 and consequently the shaft 1. A bottom radial bearing 20 is sandwiched between the shoulder 33 on the shaft 1 and a spacer ring 34 which abuts the spur gear 35 and a retaining ring 36. A wear sleeve 37 isolates a fluid seal 38 from the shaft 1. The fluid seal 38 seals the housing 3 around the bottom end of the shaft. A wear sleeve 24 isolates a fluid seal 25 from the shaft 1. The fluid seal 25 seals a top end of the housing 3 so that the housing defines the fluid reservoir 40 (see FIG. 2).

Figure 5:
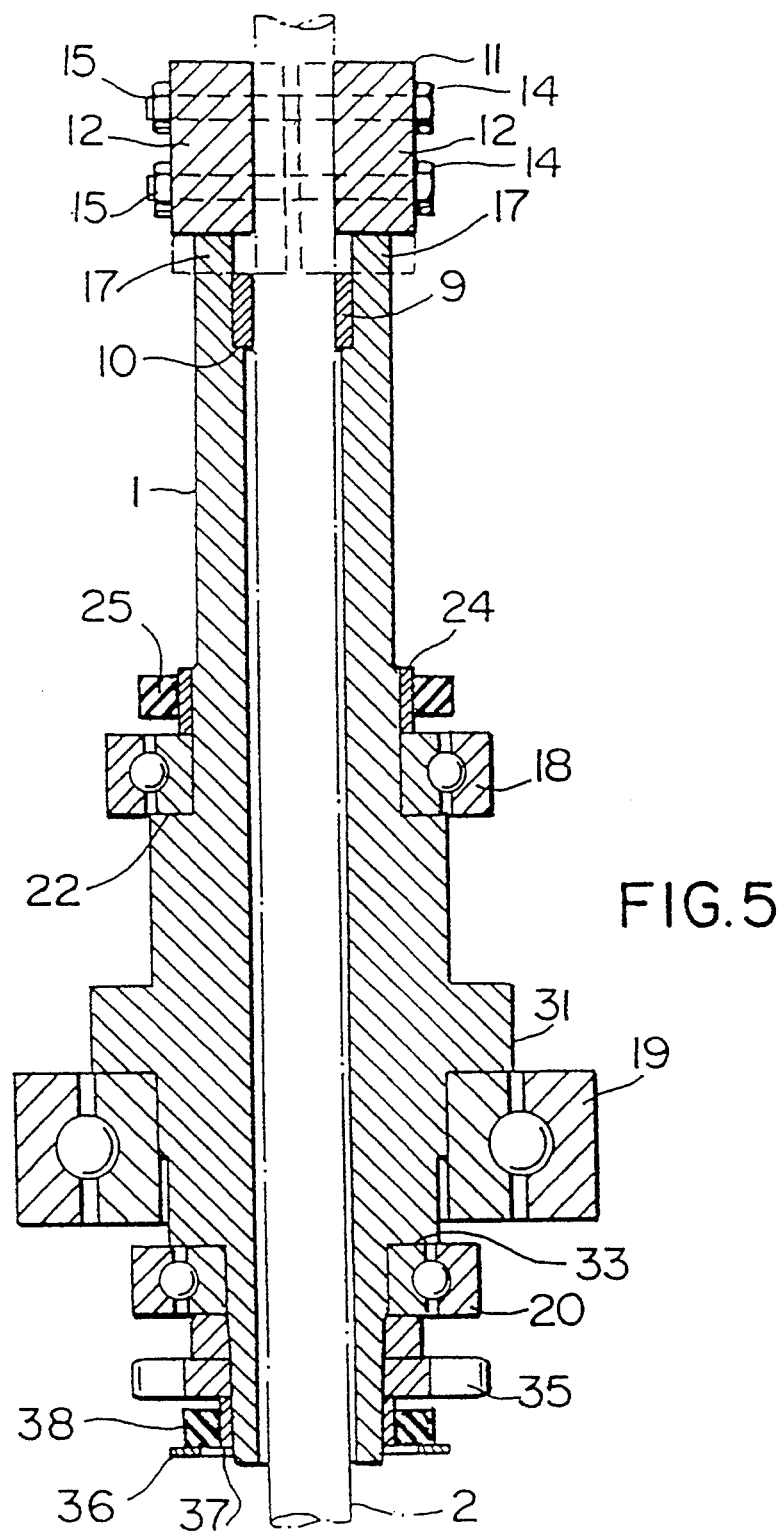
FIG. 5 is a cross-sectional view taken alone lines V—V of FIG. 4.

FIG. 5 shows the polished rod 2 extending through the axial bore in the shaft 1. The bushing 9 which rests on the internal shoulder 10 in the axial bore of the shaft 1 centers the polished rod in the axial bore. Different sized polished rods 2 may be accommodated by using a bushing 9 having a correspondingly sized internal diameter.

Figure 6:
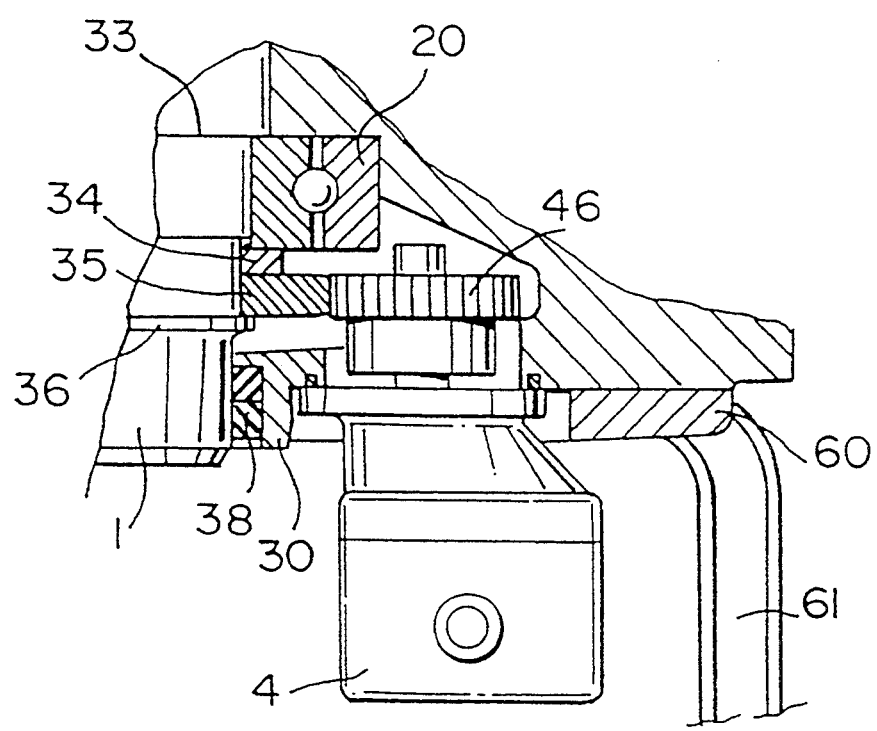
FIG. 6 is an enlarged view of the hydraulic pump shown in FIGS. 1 and 2.
Figure 7:
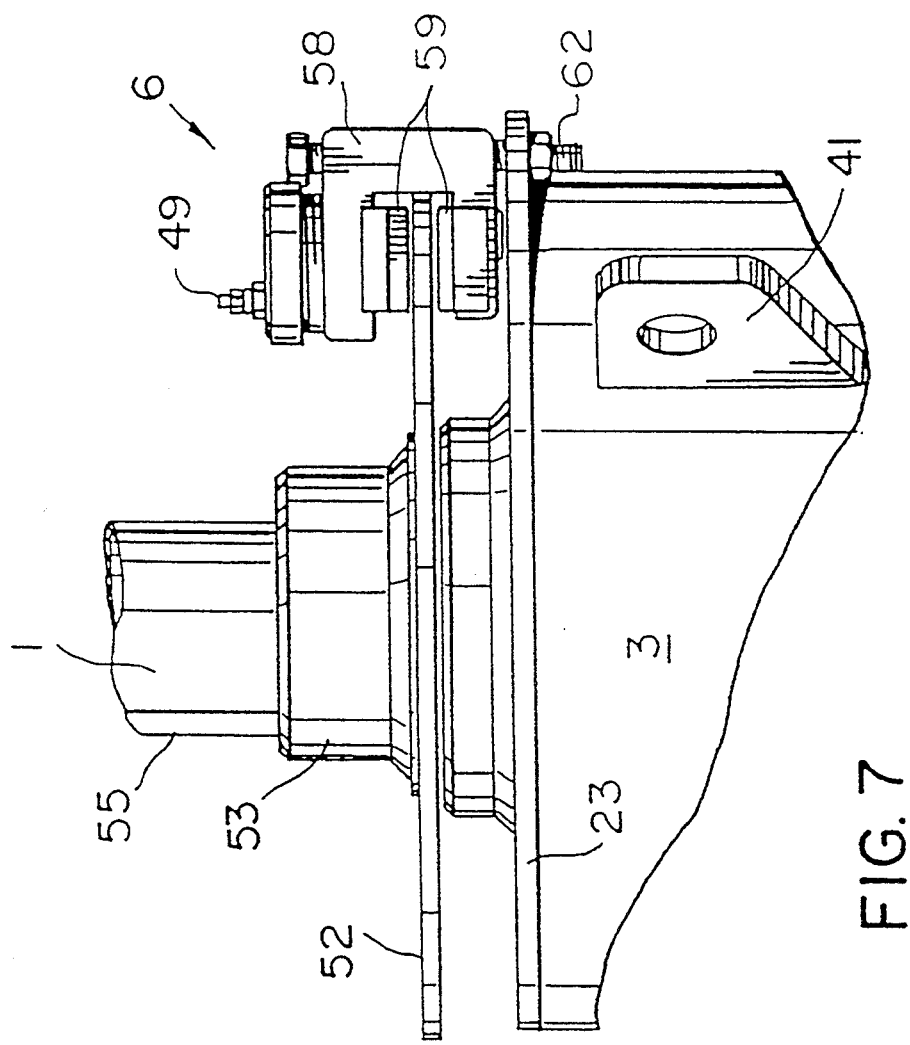
FIG. 7 is an enlarged elevational view of a top end of the disc brake assembly shown in FIG. 3.

FIG. 6 shows a detailed view of the lower right hand corner of the housing 3, and in particular, the bi-directional hydraulic pump 4. As noted above, the spur gear 35 affixed to the shaft 1 drives a complementary spur gear 46 affixed to an impeller shaft of the bi-directional hydraulic pump 4. The pump impeller (not illustrated) therefore rotates in correspondence with the shaft 1. The bi-directional hydraulic pump 4 is mounted to the bottom wall 30 of the housing 3. A gasket (not illustrated) provides a fluid seal between a mounting flange of the bi-directional hydraulic pump 4 and the bottom wall 30 of the housing 3. The bi-directional hydraulic pump 4 is therefore readily accessible for repair or replacement. FIG. 7 shows a detailed view of the brake mechanism 6. As described above, the brake mechanism 6 includes a brake disc 52 and a caliper 58. The caliper 58 is preferably a brake caliper of a type commercially available from MICO INCORPORATED, North Markoto, Minn., U.S.A. It is mounted to a projection of the top wall 23 of the housing 3 using a bolt and nut 62 in a manner recommended by the manufacturer. When hydraulic pressure is directed from the bi-directional hydraulic pump 4 by the control manifold 5 through a fluid transmission line 49, the brake pads 59 are extended to contact opposite sides of the rotor disc 52 and braking action is thereby transmitted to the shaft 1. The braking control and sequence are explained in detail below with reference to FIG. 9.

Figure 8:
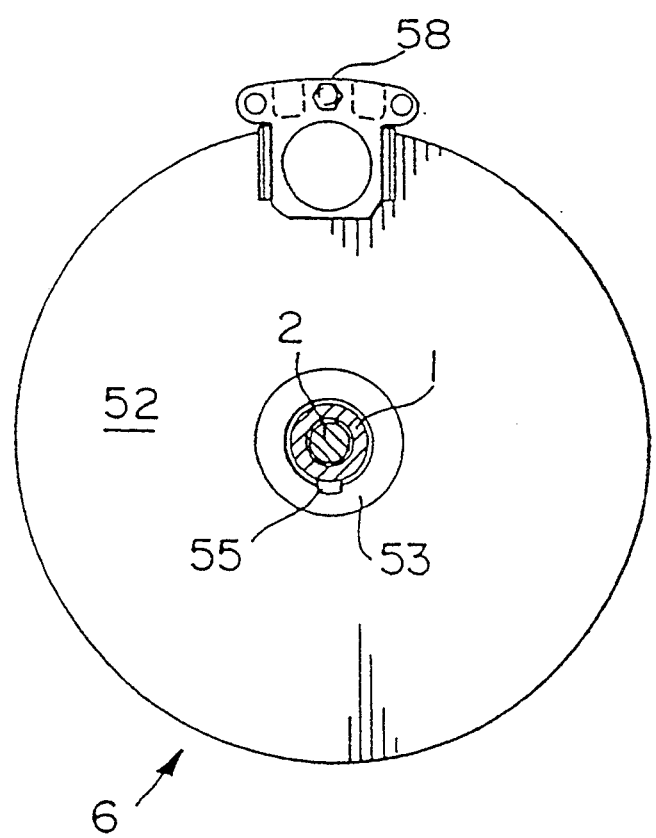
FIG. 8 is a top plan view of the disc brake assembly taken along lines VIII—VIII of FIGS. 3–7.

FIG. 8 shows a top plan view of the brake mechanism 6. The brake disc 52 is affixed to the shaft 2 by a square key 55 which engages complementary key ways in a hub 53 of the brake disc 52 and the shaft 1. The brake disc 52 therefore turns in direct correspondence with the shaft 1.

Figure 9:
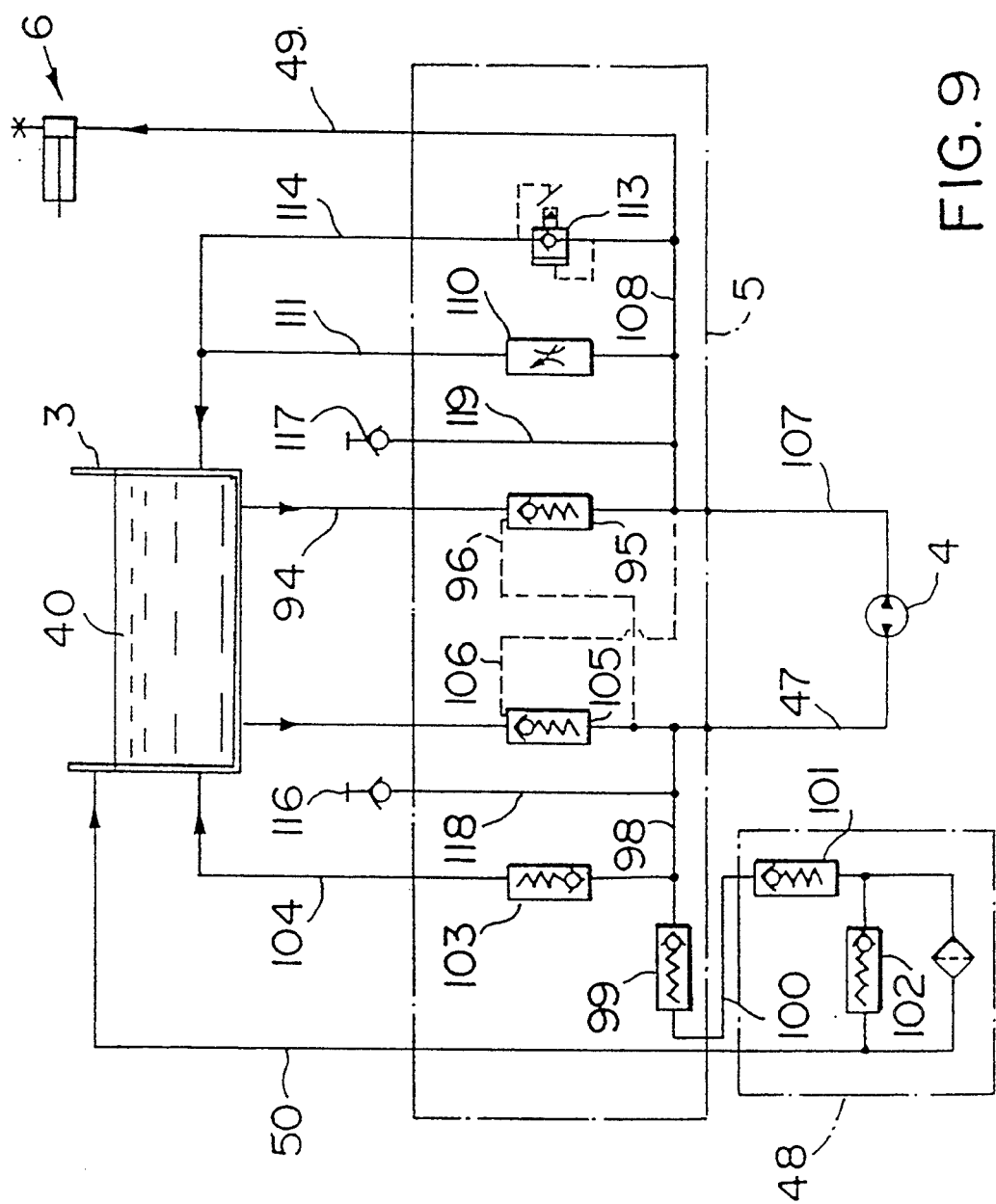
FIG. 9 is a schematic diagram of the hydraulic circuitry of a preferred embodiment of the disc brake assembly in accordance with the invention.

FIG. 9 is a schematic diagram of the hydraulic circuit that controls the brake mechanism in accordance with the invention. The fluid reservoir 40 defined by the housing 3 preferably contains a lubricating oil for lubricating the bearings 18, 19 and 20 (see FIGS. 2, 4 and 5) when the shaft 1 is turning in a normal operational direction, oil from the fluid reservoir 40 is pumped by the bi-directional hydraulic pump 4 through line 94 via a pressure operated check valve 95 in the control manifold 5. The preferred type of check valve is a snap-acting check valve which is opened by pressure on the discharge side of the pump 4 via fluid transmission line 47 and pressure transmission line 96. The output of the pump when it is rotating in the operational direction of the shaft 1 flows through line 47 to the control manifold 5 and hence through fluid transmission line 98, check valve 99, and a fluid transmission line 100 to an oil filter 48. The check valve 99 is a spring loaded valve for providing enough fluid pressure to keep the pressure operated check valve 95 open. The oil filter 48 is preferably a commercially available oil filter which includes check valves 101 and 102 designed to bypass the filter if it becomes clogged or otherwise obstructed, and to prevent backflow into the control manifold 5 of oil contaminated with filtered debris. A check valve 103 positioned in line 104 acts as a safety valve to protect the filter 48 from excessive pressure due to a blockage of line 50 which returns oil from the filter 48 to the reservoir 40. The oil returned to reservoir 40 by fluid transmission line 50 (see FIG. 3) is pumped through an orifice 51 in the top wall 23 of the housing 3 so that the returned fluid impinges directly on the top radial bearing 18, thereby ensuring that the bearings 18, 19 and 20 are respectively lubricated even if the fluid level in the fluid reservoir 40 is low.

If normal drive power to the shaft 1 is interrupted, reactive torque stored in the sucker rod string (not illustrated) may cause the polished rod 2 and, consequently, the shaft 1 (see FIGS. 4 and 5) to back-spin at destructively high speeds which creates a hazardous situation. The propelling force is the torsion in the sucker rod string which is used to transmit torque to the down hole submersible pump (not illustrated). When the drive head begins to back-spin, the reversible hydraulic pump 4 is turned in the opposite direction by the spur gear 35 (see FIG. 6) and oil is pumped through line 107 to check valve 95. As pressure builds in the fluid transmission line 107, the fluid pressure transmitted through fluid pressure transmission line 106 opens the check valve 105 and fluid flows from the fluid reservoir 40 through line 47 to supply the bi-directional hydraulic pump 4. The fluid therefore is pumped through the fluid transmission line 107, the control manifold 5, and the fluid transmission line 49 to the brake caliper 58 (see FIG. 7) of the brake unit 6. The fluid pressure on the brake caliper 6 forces the brake pads 59 to engage the brake disc 52 and brake the back-spin of the shaft 1. As rotation of the shaft 1 is slowed by the braking action, fluid pressure on the brake caliper 58 reduces correspondingly and the shaft 1 is freed to continue back-spin until all reactive torque stored in the sucker rod string is dissipated. The braking force is controlled by a pressure regulator 110 in a fluid transmission line 111 extending between the fluid transmission line 108 and the reservoir 40. The pressure regulator 110 is preferably a constant flow control type regulator. By adjusting the pressure regulator 110, the back-spin speed of the shaft 1 can be controlled within a narrow range. Furthermore, braking ceases when the back-spin speed subsides below a regulatable limit. This ensures that no reactive torque is locked in the drive train, and constitutes an important safety feature of the invention. A pressure relief valve 113 that is provided in a fluid transmission line 114 that extends between the fluid transmission line 108 and the reservoir 40 protects the hydraulic control circuit from excess fluid pressures.

Gage ports 116 and 117 are provided on lines 118 and 119 respectively. The gage ports 116 and 117 are equipped with quick disconnect fittings so that pressure readings can be taken for diagnostic purposes.

It will be readily understood by those skilled in the art that changes and modifications to the above-described embodiments may be made without departing from the scope of the invention. The scope of the invention is therefore intended to be limited solely by the scope of the intended claims.

I claim:

1. A disc brake assembly for permitting axial rotation of a shaft in a first direction and inhibiting axial rotation of the shaft in an opposite direction, comprising:

a brake disc mounted on the shaft for rotation with the shaft;

a fluid actuated brake mechanism adapted to engage the brake disc and retard rotation of the disc and consequently to retard rotation of the shaft;

a bi-directional pump for pumping fluid from a reservoir, the pump being driven by the shaft;

a control manifold for directing the fluid from the pump back to the reservoir when the shaft turns in a first direction and for directing fluid to the brake mechanism to retard rotation of the shaft when the shaft turns in the opposite direction.

2. A disc brake assembly as claimed in claim 1 wherein the brake mechanism comprises a caliper brake that straddles the disc.

3. A disc brake assembly as claimed in claim 1 wherein the control manifold includes a fluid pressure regulating valve in a fluid transmission line that directs fluid to the brake mechanism for automatically regulating fluid pressure at the brake mechanism so that rotation of the shaft in the opposite direction is controlled within a narrow regulatable range.

4. A disc brake assembly as claimed in claim 3 wherein the fluid pressure regulating valve is an adjustable valve of the constant flow control type.

5. A self-regulating disc brake assembly for controllably releasing reactive torque stored in an axially rotatable elastic member under torsion, comprising:

a shaft coupled with the elastic member to be axially rotatable with the elastic member in either direction;

a brake disc mounted on the shaft for rotation with the shaft;

a fluid actuated brake mechanism adapted to engage the brake disc and retard rotation of the brake disc and consequently retard rotation of the shaft and the elastic member;

a bi-directional pump for pumping fluid from a reservoir, the pump being driven by the shaft; and a control manifold for directing fluid from the pump back to the reservoir when the elastic member turns in a first direction to induce torsion in the member, and for directing fluid to the brake mechanism when the elastic member stops turning in the first direction and stored reactive torque is released from the elastic member under torsion.

6. A disc brake assembly as claimed in claim 5 wherein the brake mechanism comprises a caliper brake that straddles the disc.

7. A disc brake assembly as claimed in claim 6 wherein the control manifold includes:
   a) a first fluid transmission line for directing fluid from the bi-directional pump back to the reservoir when the elastic member is turned in the first direction;
   b) a second fluid transmission line for transmitting fluid to the caliper brake when the stored reactive torque is released from the elastic member;
   c) a first fluid pressure controlled check valve in the first fluid transmission line;
   d) a second fluid pressure controlled check valve in the second fluid transmission line; and
   e) a first fluid pressure transmission line connected between the first fluid transmission line and the second check valve and a second pressure transmission line connected between the second fluid transmission line and the first check valve so that the first fluid transmission line is opened and the second fluid transmission is closed when the shaft turns in the first direction and the second fluid transmission line is opened and the first fluid transmission line is closed when the stored reactive torque is released from the elastic member and the shaft turns in the opposite direction.

8. A disc brake assembly as claimed in claim 7 wherein the control manifold further includes a third fluid transmission line for directing fluid from the second fluid transmission line to the fluid reservoir, the third fluid transmission line including a pressure relief valve to protect the pump and the caliper brake from excess fluid pressure.

9. A disc brake assembly as claimed in claim 8 wherein the control manifold further includes a fourth fluid transmission line for directing fluid from the second fluid transmission line to the fluid reservoir and the fourth fluid transmission line includes an adjustable fluid pressure regulating valve of the constant flow control type to permit a speed of rotation of the shaft to be controlled within a narrow selectable range when the stored reactive torque is released from the second member.

10. A self-regulating disc brake assembly for controllably releasing reactive torque due to torsion stored in a drive string for a down hole submersible pump in a well, comprising:
   a shaft coupled with the drive string and rotatable therewith;
   a fluid reservoir surrounding and rotatably supporting the shaft;
   a coupling for connecting the fluid reservoir to a wellhead assembly of the well;
   a brake disc affixed to the shaft and rotatable therewith;
   a fluid actuated brake mechanism adapted to engage the brake disc and retard rotation of the brake disc, and consequently retard rotation of the shaft and the drive string;
   a bi-directional pump for pumping fluid from the reservoir, the pump being driven by a gear affixed to the shaft; and
   a control manifold for directing the fluid from the pump back to the reservoir when the drive string is driven in a direction to drive the down hole submersible pump, and for directing fluid to the brake mechanism when the drive string is no longer driven and reactive torque is released from the drive string to turn the drive string in an opposite direction.

11. A self-regulating disc brake assembly as claimed in claim 10 wherein the fluid reservoir comprises a housing having a top end, a bottom end and a side wall connecting the top end and the bottom end, each said end including an opening which accommodates the shaft, a fluid seal surrounding the shaft at each opening and bearings for rotatably supporting the shaft.

12. A self-regulating disc brake assembly as claimed in claim 11 wherein the brake disc is connected to the shaft just above a top end of the housing.

13. A self-regulating disc brake assembly as claimed in claim 12 wherein the brake mechanism comprises a caliper brake that straddles the disc and is affixed to the top end of the housing.

14. A self-regulating disc brake assembly as claimed in claim 10 wherein the disc brake assembly further includes a fluid filter connected to a fluid transmission line for transmitting fluid from the control manifold to the fluid reservoir so that fluid being directed back to the fluid reservoir passes through the fluid filter for cleaning.

15. A self-regulating disc brake assembly as claimed in claim 14 wherein the fluid is a lubricating oil.

16. A self-regulating disc brake assembly as claimed in claim 10 wherein the control manifold comprises:
   a) a first fluid transmission line for directing fluid from the bi-directional pump back to the reservoir when the shaft is turned in the direction to drive the down hole pump;
   b) a second fluid transmission line for transmitting fluid to the brake mechanism when the stored reactive torque is released from the drive string and the shaft is turned in the opposite direction;
   c) a first fluid pressure controlled check valve in the first fluid transmission line;
   d) a second fluid pressure controlled check valve in the second fluid transmission line; and
   e) a first fluid pressure transmission line connected between the first fluid transmission line and the second check valve and a second pressure transmission line connected between the second fluid transmission line and the first check valve so that the first fluid transmission line is opened and the second fluid transmission is closed when the drive string is driven in a direction to drive the down hole submersible pump, and the second fluid transmission line is opened and the first fluid transmission line is closed when the drive string is no longer driven and stored reactive torque is released from the drive string to turn the drive string in an opposite direction.

17. A self-regulating disc brake assembly as claimed in claim 16 wherein the control manifold further comprises a third fluid transmission line for directing fluid from the second fluid transmission line to the fluid reservoir, the third fluid transmission line including a pressure relief valve to protect the pump and the brake mechanism from excess fluid pressure.

18. A self-regulating disc brake assembly as claimed in claim 17 wherein the control manifold further comprises a fourth fluid transmission line for directing fluid from the second fluid transmission line to the fluid reservoir and the fourth fluid transmission line includes an adjustable fluid pressure regulating valve of the constant flow control type to permit a speed of rotation of the shaft to be controlled within a narrow selectable range where the stored reactive torque is released from the drive string.

19. A self-regulating disc brake assembly as claimed in claim 18 wherein the disc brake assembly further comprises a fluid filter connected with the first fluid transmission line so that fluid directed back to the reservoir is passed through the fluid filter for cleaning.

20. A self-regulating disc brake assembly as claimed in claim 19 wherein the control manifold includes a fifth fluid transmission line connected on a first end to the first fluid transmission line between the pump and the fluid filter and on a second end to the fluid reservoir, the fifth fluid transmission line including a pressure relief valve for directing fluid from the pump to the fluid reservoir in the event that the fluid filter becomes obstructed.

* * * * *